(12) United States Patent  (10) Patent No.: US 8,799,996 B2
Aikawa  (45) Date of Patent: Aug. 5, 2014

(54) LOGICAL UNIT NUMBER MANAGEMENT DEVICE, LOGICAL UNIT NUMBER MANAGEMENT METHOD, AND PROGRAM THEREFOR

(75) Inventor: Susumu Aikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 13/226,802

(22) Filed: Sep. 7, 2011

(65) Prior Publication Data

US 2012/0060203 A1 Mar. 8, 2012

(30) Foreign Application Priority Data

Sep. 7, 2010 (JP) ................. P2010-200009

(51) Int. Cl.
*H04L 9/32* (2006.01)
(52) U.S. Cl.
USPC ........... 726/3; 726/4; 711/111; 711/114; 709/216; 709/218; 709/229
(58) Field of Classification Search
CPC ..... H04L 63/08; H04L 63/10; H04L 67/1097; G06F 3/0605; G06F 3/0607; G06F 3/0631; G06F 3/067
USPC .............. 726/2–4, 21, 29; 711/100, 163, 111, 711/114; 707/705; 709/203, 216, 217, 218, 709/225, 229
See application file for complete search history.

(56) References Cited

U.S. PATENT DOCUMENTS

| 2003/0221063 A1* | 11/2003 | Eguchi et al. | 711/114 |
| 2004/0064461 A1* | 4/2004 | Pooni et al. | 707/100 |
| 2004/0153605 A1* | 8/2004 | Nakamura et al. | 711/203 |
| 2005/0010735 A1* | 1/2005 | Ito et al. | 711/163 |
| 2005/0086558 A1* | 4/2005 | Tomita | 714/6 |
| 2005/0165975 A1* | 7/2005 | Saito | 710/1 |
| 2005/0235132 A1* | 10/2005 | Karr et al. | 711/203 |

(Continued)

FOREIGN PATENT DOCUMENTS

| JP | 2001159979 A | 6/2001 |
| JP | 2003030053 A | 1/2003 |

(Continued)

OTHER PUBLICATIONS

Hu Yoshida, LUN Security Considerations for Storage Area Networks, Hitachi Data Systems Corporation, 1999.*

(Continued)

*Primary Examiner* — David García Cervetti
*Assistant Examiner* — Shanto M Abedin
(74) *Attorney, Agent, or Firm* — Sughrue Mion, PLLC

(57) ABSTRACT

A logical unit number management device includes: an access processing unit that performs information processing with access objects by using logical unit numbers for identifying logical identification information; a logical unit number management table storage unit that stores a logical unit number management table storing a corresponding relationship between the logical identification information and the logical unit numbers; a logical unit number management table changing unit that changes the corresponding relationship based on an external change request; a change completion reporting unit that reports change completion to the access processing unit when the logical unit number management table has been changed in accordance with the change request; and an access control unit that controls an access to the access object indicated by the logical identification information corresponding to one of the logical unit numbers after a report of the change completion.

6 Claims, 5 Drawing Sheets

(56) References Cited

U.S. PATENT DOCUMENTS

| | | | |
|---|---|---|---|
| 2006/0026230 A1* | 2/2006 | Raghavan et al. | 709/203 |
| 2006/0041728 A1* | 2/2006 | Taguchi | 711/163 |
| 2007/0245062 A1* | 10/2007 | Umemura | 711/100 |
| 2008/0098166 A1* | 4/2008 | Nakanishi et al. | 711/103 |
| 2008/0256317 A1* | 10/2008 | Nagasoe et al. | 711/163 |
| 2009/0106766 A1* | 4/2009 | Masuda | 718/104 |
| 2010/0199053 A1* | 8/2010 | Otani et al. | 711/162 |
| 2010/0318579 A1* | 12/2010 | Satoyama et al. | 707/802 |
| 2011/0060883 A1* | 3/2011 | Otani | 711/162 |

FOREIGN PATENT DOCUMENTS

| | | |
|---|---|---|
| JP | 2007048073 A | 2/2007 |
| JP | 2008102774 A | 5/2008 |
| JP | 2009193382 A | 8/2009 |
| JP | 2010122717 A | 6/2010 |

OTHER PUBLICATIONS

Japanese Office Action for JP2010-200009 mailed on Aug. 7, 2012.

* cited by examiner

| NUMBER OF LUNs | 3 |
|---|---|
| Logical Unit Number | LOGICAL UNIT NUMBER |
| LUN0 | VIRTUAL MEDIA A |
| LUN1 | VIRTUAL MEDIA B |
| LUN2 | VIRTUAL MEDIA C |
| LUN3 | NOT USED |

FIG. 6

| NUMBER OF LUNs | 3 |
|---|---|
| Logical Unit Number | LOGICAL UNIT NUMBER |
| LUN0 | VIRTUAL MEDIA B |
| LUN1 | DUMMY MEDIA A |
| LUN2 | VIRTUAL MEDIA D |
| LUN3 | NOT USED |

LOGICAL UNIT NUMBER MANAGEMENT DEVICE, LOGICAL UNIT NUMBER MANAGEMENT METHOD, AND PROGRAM THEREFOR

This application is based upon and claims the benefit of priority from Japanese patent application No. 2010-200009, filed on Sep. 7, 2010, the disclosure of which is incorporated herein in its entirety by reference.

BACKGROUND OF THE INVENTION

1. Field of the Invention

The present invention relates to a logical unit number management device, a logical unit number management method that manages logical unit numbers of access objects, and a program therefor.

2. Description of Related Art

There is known a technology whereby a first terminal connected to a computer system connects to an access object device such as an optical drive connected to a second terminal on the computer system via a baseboard management controller (BMC) mounted on the first terminal. The function of the BMC that provides this technology is known as virtual media function (remote media function).

In the virtual media function, based on a setting made by a manager or the like, the BMC stores a logical unit number (LUN) corresponding to an access object device connected to the second terminal, and the first terminal accesses the LUN based on this information. At this time, the BMC obtains information to be stored in a storage device of the second terminal corresponding to the accessed LUN, and executes an emulation process, enabling the first terminal to access the access object device connected to the second terminal.

Japanese Unexamined Patent Application, First Publication No. 2007-048073 discloses a method of setting a LUN in multi-LUN USB mass storage.

However, in a virtual media function using the multi-LUN method described above, depending on the mounting of a BIOS and an OS, there is a problem that only the head LUN among the multi-LUN can be identified, and a problem that the sequence of a plurality of LUNs cannot be changed. Consequently, there have been cases where it is not possible to simultaneously identify a plurality of virtual media.

SUMMARY OF THE INVENTION

An exemplary object of the invention to provide a logical unit number management device, a logical unit number management method, and a program therefor, that can solve the problems mentioned above.

A logical unit number management device according an exemplary aspect of the present invention includes: an access processing unit that performs information processing with access objects by using logical unit numbers for identifying logical identification information set in correspondence with the access objects; a logical unit number management table storage unit that stores a logical unit number management table storing a corresponding relationship between the logical identification information and the logical unit numbers; a logical unit number management table changing unit that changes the corresponding relationship stored in the logical unit number management table based on an external change request; a change completion reporting unit that reports change completion to the access processing unit when the logical unit number management table has been changed in accordance with the change request; and an access control unit that controls an access to the access object indicated by the logical identification information corresponding to one of the logical unit numbers stored in the logical unit number management table after a report of the change completion.

A logical unit number management method according an exemplary aspect of the present invention is used for a logical unit number management device, and the method includes: performing information processing with access objects by using logical unit numbers for identifying logical identification information set in correspondence with the access objects; storing a logical unit number management table storing a corresponding relationship between the logical identification information and the logical unit numbers; changing the corresponding relationship stored in the logical unit number management table based on an external change request; reporting change completion to an access processing unit when the logical unit number management table has been changed in accordance with the change request; and controlling an access to the access object indicated by the logical identification information corresponding to one of the logical unit numbers stored in the logical unit number management table after a report of the change completion.

A computer-readable storage medium according an exemplary aspect of the present invention stores a program that makes a computer of a logical unit number management device function as: an access processing unit that performs information processing with access objects by using logical unit numbers for identifying logical identification information set in correspondence with the access objects; a logical unit number management table storage unit that stores a logical unit number management table storing a corresponding relationship between the logical identification information and the logical unit numbers; a logical unit number management table changing unit that changes the corresponding relationship stored in the logical unit number management table based on an external change request; a change completion reporting unit that reports change completion to the access processing unit when the logical unit number management table has been changed in accordance with the change request; and an access control unit that controls an access to the access object indicated by the logical identification information corresponding to one of the logical unit numbers stored in the logical unit number management table after a report of the change completion.

According to an exemplary aspect of the invention, the corresponding relationship between logical identification information and the LUNs is maintained in a LUN management table, and the logical identification information corresponding to the LUNs can be changed. Therefore, even if the device can recognize only the head LUN, based on the logical identification information allocated to the head LUN by a change, it can control access to an access object corresponding to that logical identification information. It also becomes possible to freely change the relationship between the LUNs and the logical identification information.

BRIEF DESCRIPTION OF THE DRAWINGS

FIG. 6 is a second diagram of an example of data in a LUN management table according to the exemplary embodiment of the present invention.

DETAILED DESCRIPTION OF THE INVENTION

A logical unit number management device according to an exemplary embodiment of the invention will be explained with reference to the drawings.

Figure 1:
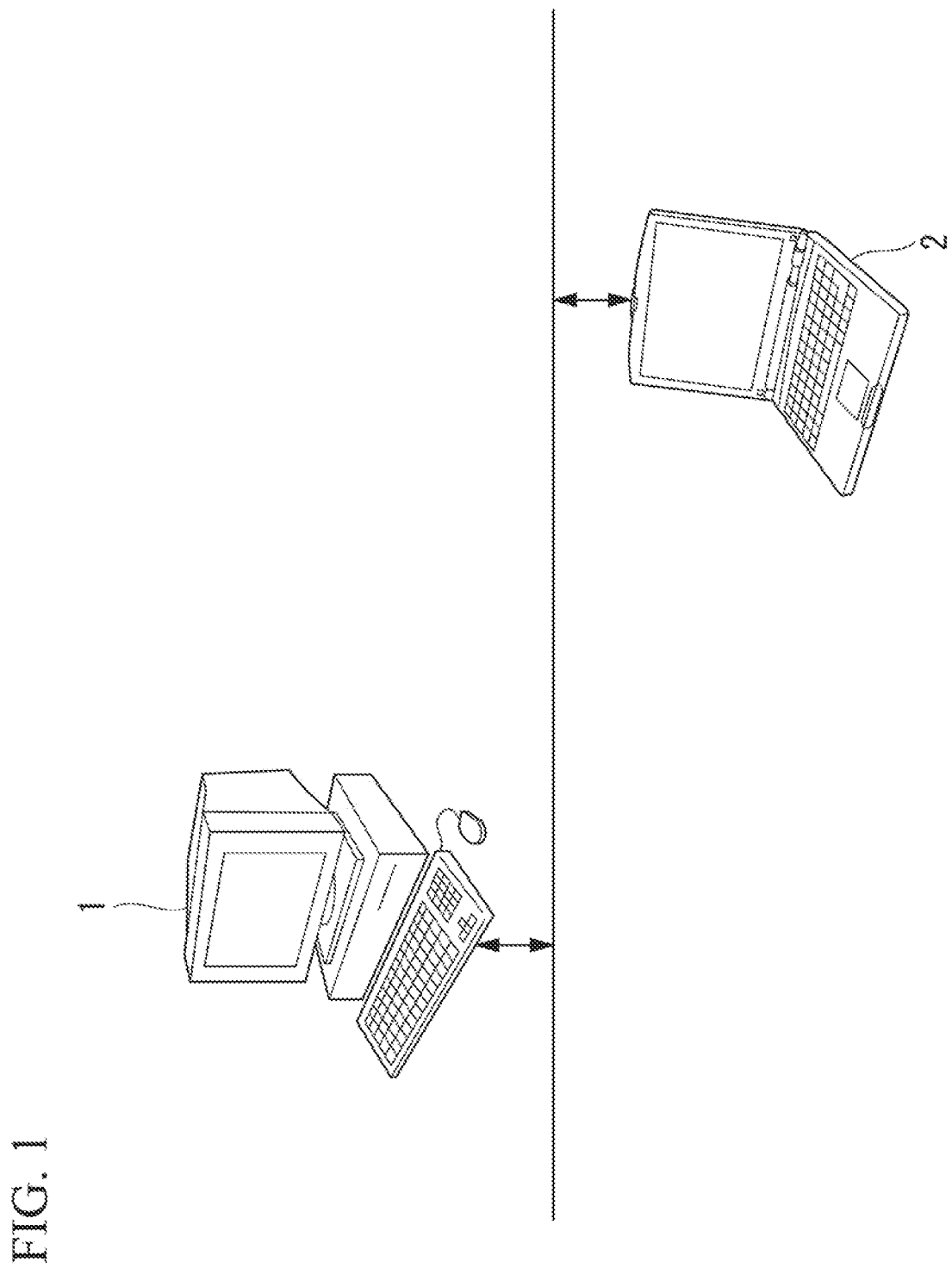
FIG. 1 is a block diagram of the configuration of a logical unit number setting system according to an exemplary embodiment of the present invention.

FIG. 1 is a block diagram of the configuration of a logical unit number setting system according to this exemplary embodiment.

The logical unit number setting system shown in FIG. 1 includes a logical unit number management device 1 that manages logical unit numbers (hereinafter simply referred to as LUNs), and a management terminal 2 that changes the LUNs stored in the logical unit number management device 1.

The logical unit number management device 1 and the management terminal 2 are connected via a communication network. The logical unit number management device 1 stores the corresponding relationships between LUNs for managing access objects connected via a USB interface and logical identification information (logical identificators) indicating access objects such as storage devices of the management terminal 2. Based on an access request for a particular LUN, the logical unit number management device 1 can access the storage device and the like of the management terminal 2 corresponding to that LUN.

Figure 2:
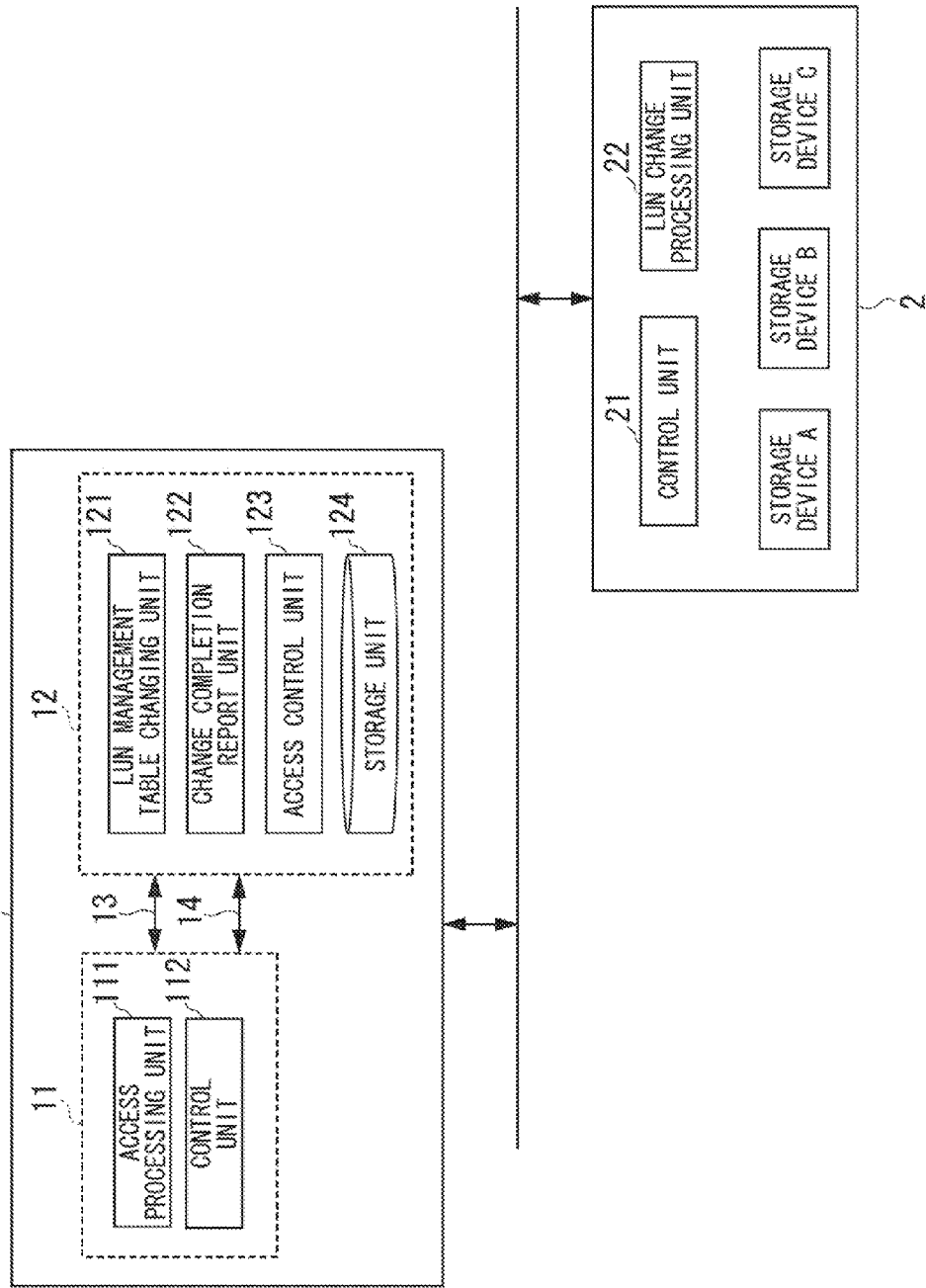
FIG. 2 is a function block diagram of a logical unit number management device and a management terminal shown in FIG. 1.

FIG. 2 is a function block diagram of a logical unit number management device and a management terminal.

As shown in FIG. 2, the logical unit number management device 1 includes a micro-processing unit (hereinafter simply referred to as MPU) 11 and a baseboard management controller (hereinafter simply referred to as BMC) 12. The MPU 11 is a processing unit that controls the logical unit number management device 1. The MPU 11 internally includes at least an access processing unit 111 and a control unit 112.

The BMC 12 monitors the internal temperature, the CPU speed, and such like, of the logical unit number management device 1. The BMC 12 also manages the corresponding relationship between the LUNs and information relating to the access objects which the logical unit number management device 1 accesses via the USB interface. To execute these management processes, the BMC 12 internally includes a LUN management table changing unit 121, a change completion report unit 122, an access control unit 123, and a storage unit 124.

The management terminal 2 includes a control unit 21, a LUN change processing unit 22, a storage device A, a storage device B, and a storage device C. The management terminal 2 may include more than three storage devices.

The function block of the logical unit number management device 1 and the management terminal 2 in FIG. 2 shows only the function configurations required for explanation of the functions of this exemplary embodiment. However, in reality the logical unit number management device 1 and the management terminal 2 include other function configurations not shown in FIG. 2. For sake of convenience, these other function configurations will not be explained here.

In this exemplary embodiment, the logical unit number management device 1 accesses the access object allocated to a LUN. The access object may be, for example, a storage device of the self device (that is, the management device 1); an external storage unit connected to the self device via a USB interface cable, a communication network, or the like; or a storage device connected to a device that is connected via a communication network or the like. In this exemplary embodiment, the logical unit number management device 1 accesses an access object that is any one of the storage devices A to C of the management terminal 2 and the storage unit 124 of the logical unit number management device 1, based on the LUN.

The access processing unit 111 of the MPU 11 accesses an access object corresponding to a LUN. By this access, for example, the MPU 11 obtains information in the storage device A of the management terminal 2, and uses this information in performing an output process, an arithmetic process, etc.

The control unit 112 of the MPU 11 is a processing unit that controls the MPU 11, such as the access processing unit 111.

The LUN management table changing unit 121 of the BMC 12 is a processing unit that changes the corresponding relationship between the LUNs and the logical identification information indicating the access objects of the logical unit number management device 1, based on a change request from the outside.

The change completion report unit 122 is a processing unit that reports the completion of a change of the corresponding relationship between the LUNs and the logical identification information made by the LUN management table changing unit 121.

The access control unit 123 is a processing unit that executes a relay (emulation process) when the access processing unit 111 of the MPU 11 accesses an access object based on a LUN.

The storage unit 124 stores various types of information.

The MPU 11 and the BMC 12 are connected to a USB interface 13 and a host interface 14. The USB interface 13 is used when the MPU 11 accesses an access object indicating logical identification information which a LUN is allocated to via the BMC 12. The host interface 14 is used when the control unit 112 of the MPU 11 changes a LUN management table t stored in the storage unit 124, etc.

In the management terminal 2, the control unit 21 is a processing unit that controls each of the processing units of the management terminal 2. The LUN change processing unit 22 requests changes in the corresponding relationship between the logical identification information and the LUNs stored in the logical unit number management device 1.

The storage devices A to C can be separated physically, or logically.

Figures 3, 4:
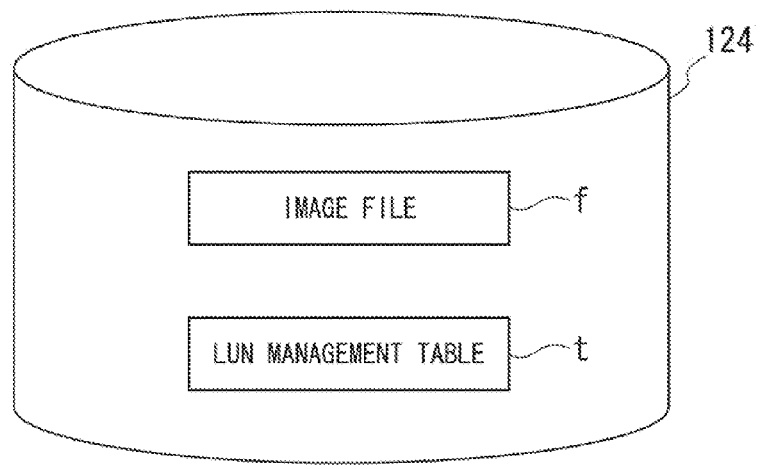
FIG. 3 is a first diagram of an example of data stored in a storage unit shown in FIG. 2.
FIG. 4 is a diagram of an example of data in a LUN management table according to the exemplary embodiment of the present invention.

FIG. 3 is an example of data stored in a storage unit.

As shown in FIG. 3, the storage unit 124 stores an image file f and a LUN management table t in separate partitions or such like. More specifically, the storage unit 124 may be constituted by a RAM, a ROM, etc. The image file f may be, for example, read by the access processing unit 111 of the MPU 11 and used in a process of some sort. The LUN management table t stores the corresponding relationship between the LUNs and the logical identification information indicating the access objects of the logical unit number management device.

FIG. 4 is an example of data in a LUN management table.

As shown in FIG. 4, the LUN management table t stored in the storage unit 124 stores the number of LUNs registered in the table t, and the corresponding relationship between each LUN and the logical identification information indicating the access object. In this exemplary embodiment, logical names of the access objects are used as the logical identification information. In this exemplary embodiment, the logical names are as follows: the storage device A of the management terminal 2 is virtual media A, the storage device B is virtual media B, the storage device C is virtual media C, and the partition storing an image file in the storage unit 124 of the BMC 12 of the logical unit number management device 1 is virtual media D. For example, as shown in FIG. 4, in the initial state of this exemplary embodiment, the virtual media A (storage device A of the management terminal 2) is registered in the LUN management table in correspondence with LUN0, the virtual media B (storage device B of the management terminal 2) with LUN1, and the virtual media C (storage device C of the management terminal 2) with LUN2.

In this state, if the access processing unit 111 of the MPU 11 accesses LUN0, the access control unit 123 of the BMC 12 controls the access of the access processing unit 111 to the storage device A of the management terminal 2 corresponding to virtual media A.

If the access processing unit 111 of the MPU 11 accesses LUN1, the access control unit 123 of the BMC 12 controls the access of the access processing unit 111 to the storage device B corresponding to virtual media B.

If the access processing unit 111 of the MPU 11 accesses LUN2, the access control unit 123 of the BMC 12 controls the access of the access processing unit 111 to the storage device C corresponding to virtual media C.

At this time, in the case where the OS and the BIOS of the logical unit number management device 1 can recognize only LUN0 and cannot recognize LUN1 and LUN2, LUN1 and LUN2 cannot be accessed.

In the logical unit number setting system shown in FIGS. 1 and 2, when the logical unit number management device 1 changes the corresponding relationship between the logical identification information and the LUN stored in the LUN management table t based on a change request from the outside, and completes the change of the LUN management table t based on the change request, it reports the completion of the change to the access processing unit 111. After the completion of the change has been reported, the access processing unit 111 of the MPU 11 accesses an access object indicated by the logical identification information corresponding to one of the LUNs stored in the LUN management table t. Then, the access control unit 123 of the BMC 12 controls the access, and relays information stored in the access object (i.e. executes an emulation process).

The provision of such functions solves the problem that, depending on the BIOS and OS that are mounted, only the head LUN among the multi-LUN can be identified, and also solves the problem that the sequence of a plurality of LUNs cannot be changed.

Figure 5:
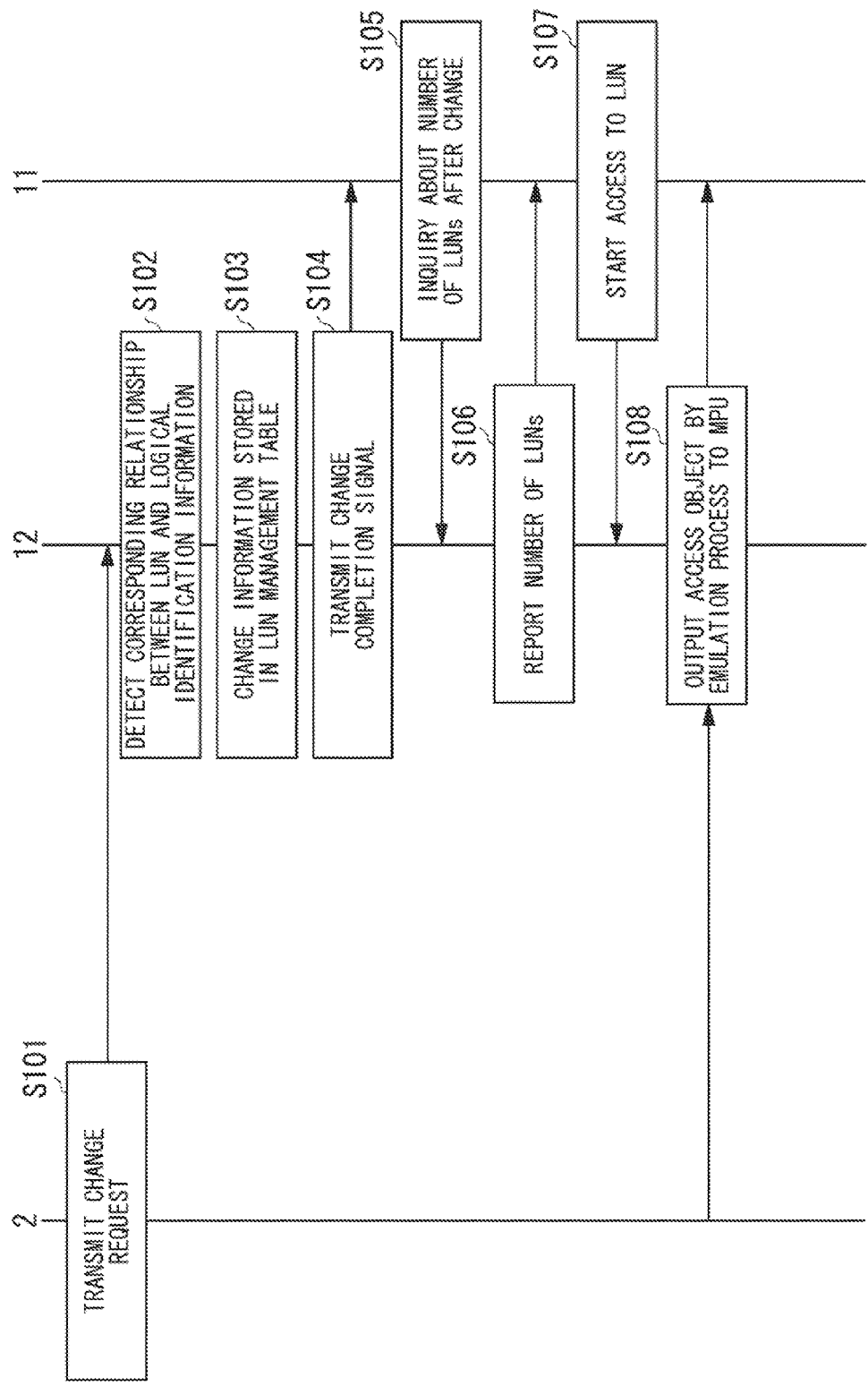
FIG. 5 is a diagram of the processing flow of a logical unit number setting system according to the exemplary embodiment of the present invention.

FIG. 5 is a diagram of a processing flow of a logical unit number setting system.

Subsequently, a processing flow of a logical unit number setting system will be explained with reference to FIGS. 1 to 5.

When the LUN management table t is in the state shown in FIG. 4, if, for example, the system manager wants to change the corresponding relationship between the logical identification information and a LUN stored in the LUN management table t, he changes the LUN by manipulating a mouse and a keyboard of the management terminal 2. The LUN may be changed via a screen of a graphical user interface (GUI) transmitted to the management terminal 2 from the logical unit number management device 1 based on an access to the device 1, or data relating to the corresponding relationship between the logical identification information and the LUN to be updated in the LUN management table t may be transmitted to the logical unit number management device 1. Specifically, for example, the LUN change processing unit 22 of the management terminal 2 transmits a change request to the logical unit number management device 1 (step S101). This change request contains information indicating the corresponding relationship between the logical identification information and the LUN stored in the LUN management table.

For example, while in the state shown in FIG. 4, the LUN management table t stores a corresponding relationship of:
 LUN0=virtual media A
 LUN1=virtual media B
 LUN2=virtual media C,
suppose that, to change this corresponding relationship, the management terminal 2 has transmitted a change request indicating a corresponding relationship of:
 LUN0=virtual media B
 LUN1=dummy media A
 LUN2=virtual media D.

When the logical unit number management device 1 receives the change request transmitted by the management terminal 2, the LUN management table changing unit 121 of the BMC 12 detects the corresponding relationship between the logical identification information and the LUN stored in the change request (step S102). The LUN management table changing unit 121 then changes the information stored in the LUN management table t to the corresponding relationship between the logical identification information and the LUN detected from the change request (step S103). When the LUN management table changing unit 121 completes the process of changing the LUN management table t, it supplies a signal indicating the change completion to the change completion report unit 122. Based on this signal, the change completion report unit 122 transmits a change completion signal via the USB interface 13 to the MPU 11 (step S104).

Upon the reception of the change completion report, the control unit 112 of the MPU 11 inquires via the USB interface 13 to the BMC 12 about the number of LUNs after the change (step S105). In response, the access control unit 123 of the BMC 12 reports the number of LUNs stored in the LUN management table t to the MPU 11 (step S106). The control unit 112 of the MPU 11 stores each number of the LUNs beforehand in accordance with the number of LUNs. For example, since in this exemplary embodiment there are three LUNs after the change, the control unit 112 detects that three LUNs, that is, LUN0, LUN1, and LUN2, are being used. The access processing unit 111 of the MPU 11 receives a specification for one of LUN0, LUN1 and LUN2 from an application program run by the self device or a user. Upon the reception of the specification, the access processing unit 111 starts accessing the specified LUN (step S107). If the OS and the BIOS can recognize only the head LUN, namely LUN0, they receive the specification of LUN0. In the logical unit number management device 1 of this exemplary embodiment, it is assumed that the OS and the BIOS can recognize the three LUNs (LUN0, LUN1, and LUN2), and they receive the specification of LUN0.

The access processing unit 111 reports, to the BMC 12, an access request storing the LUN0 which specification was received for. In response, the access control unit 123 of the BMC 12 obtains the logical identification information corresponding to LUN0 (virtual media B) from the LUN management table. The access control unit 123 then identifies the access object corresponding to virtual media B (the storage device B of the management terminal 2). The access control unit 123 then accesses the storage device B of the management terminal 2, obtains information stored in the storage device B from the management terminal 2, and executes an emulation process to supply the information via the USB interface 13 to the MPU 11 (step S108). The access processing unit 111 thus executes a process such as, for example, outputting information stored in the storage device B of the management terminal 2 to a monitor connected to the self device.

FIG. 6 is a second example of data in a LUN management table.

It is assumed that, as described above, a partition storing an image file t in the storage unit 124 of the BMC 12 of the logical unit number management device 1 is virtual media D, and, as shown in FIG. 6, this virtual media D is stored in the LUN management table t in correspondence with LUN2. In this case, information of the partition storing the image file f that constitutes virtual media D may be output to the MPU 11.

Also, as shown in FIG. 6, a dummy media A may be registered as logical identification information in correspondence with LUN1, and the MPU 11 may be made to recognize that the logical identification information corresponding to LUN1 is a dummy media. Here, a dummy media signifies that there is actually no storage device as an access object. When the LUN corresponding to the dummy media is accessed, the access control unit 123 transmits a signal indicating that access is impossible to the access processing unit 111 of the MPU 11. In response, the access processing unit 111 of the MPU 11 outputs (displays) information indicating that access is impossible to a monitor or the like.

By the processes described above, the corresponding relationship between the LUN and the logical identification information in the LUN management table t can be maintained, and the logical identification information corresponding to the LUN can be changed. Therefore, even when a device can recognize only the head LUN, the device can access an access destination corresponding to logical identification information that was allocated to the head of the LUN by executing a change. Also, the corresponding relationship between the LUN and the logical identification information can be changed freely.

The logical unit number management device 1 described above internally includes a computer system. The steps of each of the processes described above may be stored in a program format on a computer-readable recording medium, and performed by making a computer read and execute the program. Here, 'computer-readable recording medium' denotes a magnetic disc, a magneto-optical disc, a CD-ROM, a DVD-ROM, a semiconductor memory, etc.

The computer program may be distributed to a computer via a communication line, and executed by the computer that receives it.

The program may realize some of the functions described above. The program may also be a so-called differential file (differential program) that realizes the functions described above in combination with a program already stored in the computer system.

While the invention has been particularly shown and described with reference to exemplary embodiments thereof, the invention is not limited to these exemplary embodiments. It will be understood by those of ordinary skill in the art that various changes in form and details may be made therein without departing from the scope of the present invention as defined by the claims.

What is claimed is:

1. A logical unit number management device comprising:
hardware, including a processor;
a logical unit number management table storage unit implemented at least by the hardware and that stores a logical unit number management table storing at least a corresponding relationship in which first logical identification information indicating a first access object corresponds with a first logical unit number;
an access processing unit implemented at least by the hardware and that performs information processing with the first access object by using the first logical unit number;
a logical unit number management table changing unit implemented at least by the hardware and that changes the corresponding relationship stored in the logical unit number management table so that second logical identification information corresponds with the first logical unit number, based on an external change request, the second logical identification information different from the first logical identification information, the second logical identification information being a dummy media signifying that there is no storage device as an access object;
a change completion reporting unit implemented at least by the hardware and that reports change completion to the access processing unit when the logical unit number management table has been changed in accordance with the change request; and
an access control unit implemented at least by the hardware and that recognizes that the second logical identification information corresponding to the first logical unit number is the dummy media, based on a changed corresponding relationship and transmits a signal to the access processing unit, in response to an access request from the access processing unit after a report of the change completion, the changed corresponding relationship stored in the logical unit number management table, the signal indicating that an access is impossible, the access request storing the first logical unit number,
the access processing unit outputting information indicating that an access is impossible in response to the signal.

2. The logical unit number management device according to claim 1, wherein:
the change completion reporting unit reports the number of logical unit numbers registered in the logical unit number management table after change of logical unit number management table; and
the access processing unit controls an access to the access object indicated by the logical identification information corresponding to one of the logical unit numbers predetermined in accordance with the number of the logical unit numbers that was reported from the change completion reporting unit.

3. The logical unit number management device according to claim 1, wherein the access objects include storage devices of another device connected via a communication network.

4. The logical unit number management device according to claim 3, wherein the logical identification information includes logical names of storage devices included in the other devices.

5. A logical unit number management method for a logical unit number management device, the method comprising:
storing a logical unit number management table storing at least a corresponding relationship in which first logical identification information indicating a first access object corresponds with a first logical unit number;

performing information processing with the first access object by using the first logical unit number;

changing the corresponding relationship stored in the logical unit number management table so that second logical identification information corresponds with the first logical unit number, based on an external change request, the second logical identification information different from the first logical identification information, the second logical information being a dummy media signifying that there is no storage device as an access object;

reporting change completion to an access processing unit when the logical unit number management table has been changed in accordance with the change request;

recognizing that the second logical identification information corresponding to the first logical unit number is the dummy media, based on a changed corresponding relationship and transmitting a signal to the access processing unit, in response to an access request from the access processing unit after a report of the change completion, the changed corresponding relationship stored in the logical unit number management table, the signal indicating that an access is impossible, the access request storing the first logical unit number;

outputting information indicating that an access is impossible in response to the signal.

6. A non-transitory computer-readable storage medium storing a program that makes a computer comprising hardware including at least a processor and of a logical unit number management device function as:

a logical unit number management table storage unit implemented at least by the hardware and that stores a logical unit number management table storing at least a corresponding relationship in which first logical identification information indicating a first access object corresponds with a first logical unit number;

an access processing unit implemented at least by the hardware and that performs information processing with the first access object by using the first logical unit number;

a logical unit number management table changing unit implemented at least by the hardware and that changes the corresponding relationship stored in the logical unit number management table so that second logical identification information corresponds with the first logical unit number, based on an external change request, the second logical identification information different from the first logical identification information, the second logical identification information being a dummy media signifying that there is no storage device as an access object;

a change completion reporting unit implemented at least by the hardware and that reports change completion to the access processing unit when the logical unit number management table has been changed in accordance with the change request; and an access control unit implemented at least by the hardware and that recognizes that the second logical identification information corresponding to the first logical unit number is the dummy media, based on a changed corresponding relationship and transmits a signal to the access processing unit in response to an access request storing the first logical unit number from the access processing unit after a report of the change completion, the changed corresponding relationship stored in the logical unit number management table, the signal indicating that an access is impossible, the access request storing the first logical unit number, the access processing unit outputting information indicating that an access is impossible in response to the signal.

* * * * *